United States Patent [19]

Brandt

[11] Patent Number: 5,053,363
[45] Date of Patent: Oct. 1, 1991

[54] CERAMIC CUTTING MATERIAL REINFORCED BY WHISKERS

[75] Inventor: Nils G. L. Brandt, Solna, Sweden

[73] Assignee: Sandvik AB, Sandviken, Sweden

[21] Appl. No.: 402,778

[22] Filed: Sep. 5, 1989

[30] Foreign Application Priority Data

Sep. 2, 1988 [SE] Sweden ................................. 8803090

[51] Int. Cl.$^5$ ........................ C04B 35/02; C04B 35/08
[52] U.S. Cl. ...................................... 501/95; 501/96; 501/153
[58] Field of Search ...................... 501/95, 96, 89, 92, 501/153

[56] References Cited

U.S. PATENT DOCUMENTS

| 3,890,250 | 6/1975 | Richerson | 501/97 |
| 4,636,374 | 1/1987 | Kurihara et al. | 501/96 |
| 4,745,091 | 5/1988 | Landingham | 501/89 |
| 4,761,388 | 8/1988 | Oguri et al. | 501/95 |
| 4,777,155 | 10/1988 | Baba et al. | 501/96 |
| 4,789,277 | 12/1988 | Rhodes et al. | 501/89 |
| 4,801,564 | 1/1989 | Baba | 501/92 |
| 4,804,645 | 2/1989 | Ekstrom | 501/95 |

FOREIGN PATENT DOCUMENTS 0279673 8/1988 European Pat. Off.
3191504 8/1988 Japan.

Primary Examiner—William R. Dixon, Jr.
Assistant Examiner—Sue Hollenbeck
Attorney, Agent, or Firm—Burns, Doane, Swecker & Mathis

[57] ABSTRACT

A ceramic cutting insert including whiskers for chip forming machining of steel and having improved mechanical, thermal and wear properties. The insert comprises an oxide based matrix and 5-50% by volume, preferably 10-40% by volume, of homogeneously dispersed whiskers of a solid solution of nitride and oxide of aluminum, preferably of the cubic aluminum oxynitride spinel (AlON). A part of the whiskers constituent may be replaced by whiskers of silicon carbide. The properties of the composite material can be further modified by coating the whisker material with thin layers. The whisker reinforced cutting material shows an improved toughness behavior compared to non-whisker containing ceramic materials.

29 Claims, No Drawings

CERAMIC CUTTING MATERIAL REINFORCED BY WHISKERS

BACKGROUND OF THE INVENTION

The present invention relates to ceramic cutting tool materials and, in particular, to such cutting materials in which monocrystalline whiskers (hair crystals) based upon aluminum are homogeneously distributed in an oxide based ceramic matrix which leads to an improved strength and toughness without having a negative influence on the wear resistance to any appreciable extent.

Ceramic cutting tools have now been available for several decades but it has only been in the last ten years that they have achieved commercial importance for use in chip forming machining. The main reason for the limited use of ceramic cutting tools has been sudden and unexpected cutting insert failures because of inadequate strength and toughness.

During the last ten years the properties of ceramic cutting materials have been improved in many respects. As such, they have increased their relative market share in cutting of cast iron and (nickel-base) alloys with high heat resistance. In cutting of steel, which is by far the most dominating operation in the field of chip forming machining, the share of ceramic cutting inserts is still very modest. This is because a steel workpiece material places extreme and simultaneous demands on the strength, toughness and wear resistance of the cutting insert. To date, it has not been possible to fulfill these demands by known cutting tool materials.

Aluminum oxide based cutting tools are very sensitive to thermal cracking as aluminum oxide in itself has a relatively low thermal conductivity. This fact leads to a very short life in steel cutting, particularly under conditions having short engagement times and varying cutting depths.

To a certain extent the thermal properties have been improved by an addition of titanium carbide and/or titanium nitride which improves the thermal conductivity of the composite material. The addition of titanium carbide/nitride also increases the hardness of the material. In comparison with pure aluminum oxide materials, an increased life is therefore obtained in cutting of hard workpiece materials and in operations demanding resistance to thermal shocks. This type of material has, however, too poor a toughness behavior for a general use in cutting of steel.

A more recent development has been the addition of homogeneously dispersed fine-grained zirconium oxide particles in a matrix of aluminum oxide. Transformation of the "metastable" zirconium oxide particles during use increases both strength and toughness and will, thus, lead to a more predictable life.

The thermal properties of the foregoing type of material are, however, insignificantly better than those of pure aluminum oxide materials. This is why initiation and growth of thermally induced cracks are still great problems in practical cutting operations generating high cutting edge temperatures, such as in machining of steel.

It has recently been shown, e.g. U.S. Pat. No. 4,543,345 and EP-A-194 811, that alloying the SiC-whiskers, monocrystalline hair crystals, in a matrix of aluminum oxide leads to a greatly improved fracture toughness and strength. Ceramic cutting materials based upon this concept have exhibited very good performance in cutting of materials with high heat strength but in cutting of steel they have shown surprisingly short tool lives because of preferential attacks of the SiC-crystals. SiC has a high solubility in steel and is thus dissolved at a high rate leading to a weakening of the surface zone with accompanying high wear and risks of initiation of fractures.

EP-A-279 673 discloses aluminum oxide or aluminum nitride whiskers in a composite powder of alumina. DE 34 45 766 and DE 35 18 844 disclose alumina whiskers in a ceramic matrix. EP-A-283 454 discloses the use of whiskers of nitrides and/or carbides and/or borides of Ti and/or Zr in an oxide based matrix. The matrix may consist of oxides only (white ceramics) or it may additionally contain hard particles of carbides or nitrides (black ceramics). For compounds with extended homogeneity range, such as TiC, the disclosure is not restricted to only compounds with stoichiometric composition. EP-A-296 133 discloses the use of platelike "whiskers" (platelets) in a ceramic matrix and EP-A-295 228 discloses the use of a mixture of thin whiskers, thick whiskers and/or platelets in a ceramic matrix.

An object of the present invention is to obtain a ceramic material for chip forming machining of steel, in particular, where the above mentioned weaknesses of the known aluminum oxide based cutting materials have been eliminated. In materials according to the invention there is, thus, a unique combination of strength, toughness, thermal shock resistance and wear resistance, which has not been possible to obtain by previously known oxide based cutting materials.

SUMMARY OF THE INVENTION

The present invention provides oxide based ceramic cutting materials reinforced by whiskers having a low solubility in steel resulting in that the cutting material obtains an improved and more predictable toughness, strength and thermal shock resistance without appreciably deteriorating the wear resistance in cutting of steel, in particular, which has not been possible by previously known compositions.

The present invention provides an oxide based ceramic cutting insert for chip forming machining of steel, the insert comprising an oxide based matrix and 5–50% by volume of homogeneously dispersed whiskers of a solid solution of nitride and oxide of aluminum.

The present invention also provides an oxide based ceramic cutting insert comprising an oxide based matrix and 5–50% by volume of homogeneously dispersed whiskers of a solid solution of nitride and oxide of aluminum of the cubic aluminum oxynitride spinel (AlON).

The present invention also provides a method of cutting metal with a cutting tool comprising a step of bringing the cutting tool into contact with a metal workpiece and displacing the metal workpiece relative to the cutting tool such that metal is removed from the metal workpiece by the cutting tool, the cutting tool comprising an oxide based matrix and whiskers of a solid solution of nitride and oxide of aluminum homogeneously dispersed in the matrix.

DETAILED DESCRIPTION OF THE PREFERRED EMBODIMENT

The ceramic cutting material according to the present invention comprises an oxide based, preferably aluminum oxide based, matrix with 5–50, preferably 10–40, especially 25–35% by volume homogeneously dispersed whiskers based upon a solid solution of nitride and oxide of aluminum. The solid solution of nitride and oxide can preferably comprise cubic aluminum oxynitride spinel (AlON). The whiskers can be mono-crystals with a diameter of 0.5–10 μm and a length of 2.5–100 μm and further characterized by a length/diameter ratio which preferably is 5–10. Alternatively, the whiskers can be monocrystalline platelets with a thickness of 0.5–8 μm and a diameter of 10–50 μm. The grain size of the oxide matrix can be <10 μm, preferably <4 μm. The oxide matrix can comprise ceramic oxides or ceramic oxides mixed with hard carbides and/or nitrides and/or borides and/or binder metal from groups IVB, VB or VIB of the periodic table, e.g. Ti, Zr, Mo and W. Preferably, the ceramic matrix can contain <20% by volume $ZrO_2$.

A portion of the above mentioned whiskers, such as less than 50% (one-half), may be replaced by silicon carbide whiskers. As such, a favorable influence on the thermal shock resistance of the cutting insert can be obtained without notably reducing the wear resistance when machining steel at moderate cutting speed provided that the total amount of SiC whiskers does not exceed 15% by volume.

The cutting material according to the invention can be made by wet milling and mixing of oxide based powder and monocrystalline whisker crystals together with suitable sintering aids such as MgO, CaO, $Y_2O_3$ and/or $ZrO_2$. After a drying step, the mixture is compacted to a desired geometrical form and sintered without pressure to obtain near theoretical density. After the sintering step, the possible remaining closed porosity can be removed by a hot isostatic pressing step. If it is not possible by sintering to obtain a closed porosity, the material can be pressure sintered in a suitable graphite tool or, after encapsulating, it can be hot isostatically pressed to desired density. The sintering method is dependent upon the whisker material and is chosen so that the material reaches a density which exceeds 99% of the theoretical density. In the preferred embodiment, the whisker material consists of aluminumoxinitride (AlON) and the matrix is aluminum oxide based, which allows pressureless sintering of the material with up to 40% by volume of whiskers.

Use of whisker reinforcement in the aluminum oxide based matrix leads to a significant increase of the fracture strength. The mechanisms which cause this increase can be load transfer between whisker and matrix, crack deflection and whisker pull out. These mechanisms utilize and are dependent upon the crack propagation taking place along a sufficiently weak boundary surface between whisker and matrix. The bonding strength between whisker and matrix is therefore an important parameter which can be influenced by coating of the whisker material with one or more thin layers of a suitable material such as BN and carbon which decreases the bonding strength between the whisker and the matrix in order to further improve the fracture toughness.

Alumina whiskers give a significant increase of the fracture toughness but even better properties seem to be obtained if nitrogen is incorporated in the lattice to form solid solutions in the $AlN-Al_2O_3$ quasibinary system. It is well known that nitrogen additions to $Al_2O_3$ can produce an aluminumoxinitride (AlON) of a cubic structure closely related to the gamma-$Al_2O_3$-structure. The better properties of composites made from aluminumoxinitride whiskers seem to be related to different bonding properties between whisker and matrix.

EXAMPLE 1

Two mixtures are prepared by wet-mixing 30% by volume of aluminumoxinitride whiskers (Sample 1) and 30% by volume of aluminum oxide whiskers (Sample 2), respectively, with 70% by volume of a mixture of 95.5 wt. % $Al_2O_3$, 4.2 wt. % $ZrO_2$ and 0.3 wt. % MgO. After drying in vacuum, the mixtures are dry-mixed and pressed to blanks. The blanks are sintered at 1550° C. to 99% of theoretical density.

The fracture toughness ($K_{IC}$) is measured by means of the so called indentation method. An impression is made with the aid of a pyramid shaped diamond indenter and $K_{IC}$ is calculated from the length of the cracks which are induced from the corners of the indenter.

The fracture toughness of a reference material comprising $Al_2O_3$ + 4.2% by weight $ZrO_2$ + 0.3% by weight MgO (Sample 3) is used to compare the measurements.

The result of the $K_{IC}$ determination is shown in Table 1.

TABLE 1

| Sample No. | Material of Sample | $K_{IC}$ |
|---|---|---|
| 1 | $Al_2O_3$ + 4.2% by weight $ZrO_2$ + 0.3% by weight MgO + 30% by volume AlON (whiskers) | 5.7 |
| 2 | $Al_2O_3$ + 4.2% by weight $ZrO_2$ + 0.3% by weight MgO + 30% by volume $Al_2O_3$ (whiskers | 4.8 |
| 3 | $Al_2O_3$ + 4.2% by weight $ZrO_2$ + 0.3% by weight MgO | 4.0 |

It is obvious from the results given in Table 1 that incorporation of AlON-whiskers will provide a significant increase in the fracture toughness. The fracture toughness is a parameter which shows the ability of material to resist mechanical stresses without catastrophic failure. In the case of chip forming machining it means that higher feeds can be allowed, i.e. the rate of the material removal can be increased for a given cutting speed. For machining of iron based workpieces, composites with AlON-whiskers are preferred because they show the best combination of wear and toughness.

A method of cutting metal in accordance with the present invention comprises a step of bringing a cutting tool into contact with a metal workpiece and displacing the metal workpiece relative to the cutting tool such that metal is removed from the metal workpiece by the cutting tool, the cutting tool comprising an oxide based matrix and whiskers of a solid solution of nitride and oxide of aluminum homogeneously dispersed in the matrix. The metal workpiece can comprise a steel workpiece and the cutting step can be performed by moving the metal workpiece and the cutting tool. Alternatively, only the workpiece is moved or only the cutting tool is moved. The whiskers can comprise 5–50% by volume of the cutting tool and the matrix can comprise ceramic oxides or ceramic oxides mixed with one or more hard carbides and/or nitrides and/or borides and/or binder metal. For instance, the matrix can comprise aluminum oxide and less than 20% by volume $ZrO_2$. Less than one-half of the whiskers can comprise SiC whiskers, the total amount of the SiC whiskers being less than 15% by volume. The matrix preferably contains a total of 10–40% by volume of the whiskers and the matrix can have a grain size of less than 4 μm. Preferably, the whiskers comprise cubic aluminum oxynitride spinel (AlON). The whiskers can comprise mono-crystals having a diameter of about 0.5–10 μm, a length of about 2.5–100 μm and a length/diameter ratio of about 5–10. At least some or all of the whiskers can comprise platelets having a thickness of about 0.5–8 μm and a diameter of about 10–50 μm.

While the present invention has been described with reference to the foregoing embodiments, various changes and modifications may be made thereto which fall within the scope of the appended claims.

What is claimed is:

1. An oxide based ceramic cutting insert for chip forming machining of steel, said insert comprising an oxide based matrix and 5–50% by volume of homogeneously dispersed whiskers of a solid solution of AlON of aluminum.

2. The cutting insert of claim 1, wherein the matrix comprises ceramic oxides or ceramic oxides mixed with one or more hard carbides and/or nitrides and/or borides and/or binder metal.

3. The cutting insert of claim 1, wherein the matrix comprises aluminum oxide and less than 20% by volume of $ZrO_2$.

4. The cutting insert of claim 2, wherein the matrix comprises aluminum oxide and less than 20% by volume of $ZrO_2$.

5. The cutting insert of claim 1, wherein less than one-half of said whiskers are SiC whiskers, the total amount of the SiC whiskers being less than 15% by volume.

6. The cutting insert of claim 2, wherein less than one-half of said whiskers are SiC whiskers, the total amount of the SiC whiskers being less than 15% by volume.

7. The cutting insert of claim 3, wherein less than one-half of said whiskers comprise SiC whiskers, the total amount of the SiC whiskers being less than 15% by volume.

8. The cutting insert of claim 1, wherein 10–40% by volume said whiskers are contained in said matrix, the matrix having a grain size of less than 4 μm.

9. The cutting insert of claim 1, wherein the whiskers comprise cubic aluminum oxynitride spinel (AlON).

10. The cutting insert of claim 1, wherein the whiskers comprise mono-crystals having a diameter of about 0.5–10 μm.

11. The cutting insert of claim 10, wherein the whiskers have a length of about 2.5–100 μm.

12. The cutting insert of claim 11, wherein the whiskers have a length/diameter ratio of about 5–10.

13. The cutting insert of claim 1, wherein at least some of the whiskers are replaced by platelets of a solid solution of AlON having a thickness of about 0.5–8 μm.

14. The cutting insert of claim 13, wherein the platelets have a diameter of about 10–50 μm.

15. A method of cutting metal with a cutting tool comprising a step of bringing the cutting tool into contact with a metal workpiece and displacing the metal workpiece relative to the cutting tool such that metal is removed from the metal workpiece by the cutting tool, the cutting tool comprising an oxide based matrix and whiskers of a solid solution of AlON homogeneously dispersed in the matrix.

16. The method of claim 15, wherein the metal workpiece comprises a steel workpiece.

17. The method of claim 15, wherein only the workpiece is moved during the cutting step.

18. The method of claim 15, wherein only the cutting tool is moved during the cutting step.

19. The method of claim 15, wherein the whiskers comprise 5–50% by volume of the cutting tool.

20. The method of claim 15, wherein the matrix comprises ceramic oxides or ceramic oxides mixed with one or more hard carbides and/or nitrides and/or borides and/or binder metal.

21. The method of claim 15, wherein the matrix comprises aluminum oxide and less than 20% by volume $ZrO_2$.

22. The method of claim 15, wherein less than one-half of the whiskers are SiC whiskers, the total amount of the SiC whiskers being less than 15% by volume.

23. The method of claim 15, wherein 10–40% by volume of the whiskers are contained in the matrix, the matrix having a grain size of less than 4 μm.

24. The method of claim 15, wherein the whiskers comprise cubic aluminum oxynitride spinel (AlON).

25. The method of claim 15, wherein the whiskers comprise mono-crystals having a diameter of about 0.5–10 μm.

26. The method of claim 25, wherein the whiskers have a length of about 2.5–100 μm.

27. The method of claim 26, wherein the whiskers have a length/diameter ratio of about 5–10.

28. The method of claim 15, wherein at least some of the whiskers are replaced by platelets of a solid solution of AlON having a thickness of about 0.5–8 μm.

29. The method of claim 28, wherein the platelets have a diameter of about 10–50 μm.

* * * * *